(12) United States Patent
Sethu et al.

(10) Patent No.: US 10,534,368 B2
(45) Date of Patent: Jan. 14, 2020

(54) CROWDSOURCE-BASED VIRTUAL SENSOR GENERATION AND VIRTUAL SENSOR APPLICATION CONTROL

(71) Applicant: GM GLOBAL TECHNOLOGY OPERATIONS LLC, Detroit, MI (US)

(72) Inventors: Ramesh Sethu, Troy, MI (US); Arun Adiththan, Warren, MI (US); Shuqing Zeng, Sterling Heights, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 197 days.

(21) Appl. No.: 15/632,802

(22) Filed: Jun. 26, 2017

(65) Prior Publication Data

US 2018/0373266 A1  Dec. 27, 2018

(51) Int. Cl.
| | |
|---|---|
| G05D 1/02 | (2006.01) |
| H04W 4/04 | (2009.01) |
| H04W 4/46 | (2018.01) |
| H04W 84/18 | (2009.01) |
| H04W 4/02 | (2018.01) |
| B60W 30/09 | (2012.01) |
| B60W 30/12 | (2006.01) |
| B60W 30/18 | (2012.01) |
| B60W 30/14 | (2006.01) |
| H04W 4/38 | (2018.01) |

(52) U.S. Cl.
CPC .......... *G05D 1/0276* (2013.01); *H04W 4/046* (2013.01); *H04W 4/46* (2018.02); *B60W 30/09* (2013.01); *B60W 30/12* (2013.01); *B60W 30/14* (2013.01); *B60W 30/18163* (2013.01); *G05D 2201/0213* (2013.01); *H04W 4/026* (2013.01); *H04W 4/38* (2018.02); *H04W 84/18* (2013.01)

(58) Field of Classification Search
CPC ........ G05D 1/0276; G05D 2201/0213; H04W 4/46; H04W 4/046; H04W 4/38; H04W 4/026; H04W 84/18; B60W 30/14; B60W 30/12; B60W 30/09; B60W 30/18163
USPC .......................................... 701/23
See application file for complete search history.

(56) References Cited

U.S. PATENT DOCUMENTS

2016/0357187 A1* 12/2016 Ansari ................. G01S 15/931

* cited by examiner

*Primary Examiner* — Brian P Sweeney
(74) *Attorney, Agent, or Firm* — Lorenz & Kopf, LLP

(57) ABSTRACT

A crowdsourced virtual sensor generator is provided which could be generated by a vehicle or provided to the vehicle as, for example, a service. The crowdsourced virtual sensor generator may include, but is not limited to, a communication system configured to receive contributing vehicle sensor data from one or more contributing vehicles, a location of the one or more contributing vehicles and a target vehicle, and a processor, the processor configured to filter the received contributing vehicle sensor data based upon the location of the one or more contributing vehicles and the location of the target vehicle, aggregate the filtered contributing vehicle sensor data into at least one of a data-specific dataset and an application-specific data set, and generate a virtual sensor for the target vehicle, the virtual sensor processing the filtered and aggregated contributing vehicle sensor data to generate output data relative to the location of the target vehicle.

9 Claims, 5 Drawing Sheets

CROWDSOURCE-BASED VIRTUAL SENSOR GENERATION AND VIRTUAL SENSOR APPLICATION CONTROL

INTRODUCTION

The present invention generally relates to a vehicle, and more particularly relates to vehicle sensors.

Vehicles may be equipped with a variety of sensors. The sensors can be used for a number of purposes, including, but not limited to, object tracking, collision detection, navigation, temperature sensing, road condition sensing, weather sensing, and the like. However, sensors can be expensive and the sensor data from the vehicle sensors may be limited to what the sensor can detect from the line of site of the vehicle.

Accordingly, it is desirable to reduce the cost of sensors on the vehicle while improving the sensing capabilities. Furthermore, other desirable features and characteristics of the present invention will become apparent from the subsequent detailed description of the invention and the appended claims, taken in conjunction with the accompanying drawings and the background of the invention.

SUMMARY

In accordance with one embodiment, a crowdsourced virtual sensor generator is provided. The crowdsourced virtual sensor generator may include, but is not limited to, a server, the server including, but not limited to a communication system configured to receive contributing vehicle sensor data from one or more sensors on one or more contributing vehicles, a location of the one or more contributing vehicles and a location of a target vehicle, and a processor communicatively coupled to the communication system, the processor configured to filter the received contributing vehicle sensor data based upon the location of the one or more contributing vehicles and the location of the target vehicle, aggregate the filtered contributing vehicle sensor data into at least one of a data-specific dataset and an application-specific data set, generate a virtual sensor for the target vehicle, the virtual sensor processing the filtered and aggregated contributing vehicle sensor data to generate output data relative to the location of the target vehicle, and transmit the output data from of the virtual to the target vehicle via the communications system.

In accordance with another embodiment, a vehicle is provided. The vehicle may include, but is not limited to, a communication system configured to receive contributing vehicle sensor data from one or more sensors on one or more contributing vehicles and a location of the one or more contributing vehicles, a processor communicatively coupled to the communication system, the processor configured to filter the received contributing vehicle sensor data based upon the location of the one or more contributing vehicles and the location of the vehicle, aggregate the filtered contributing vehicle sensor data into at least one of a data-specific dataset and an application-specific data set, and generate a virtual sensor for the vehicle, the virtual sensor processing the filtered and aggregated contributing vehicle sensor data to generate output data relative to the location of the vehicle.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
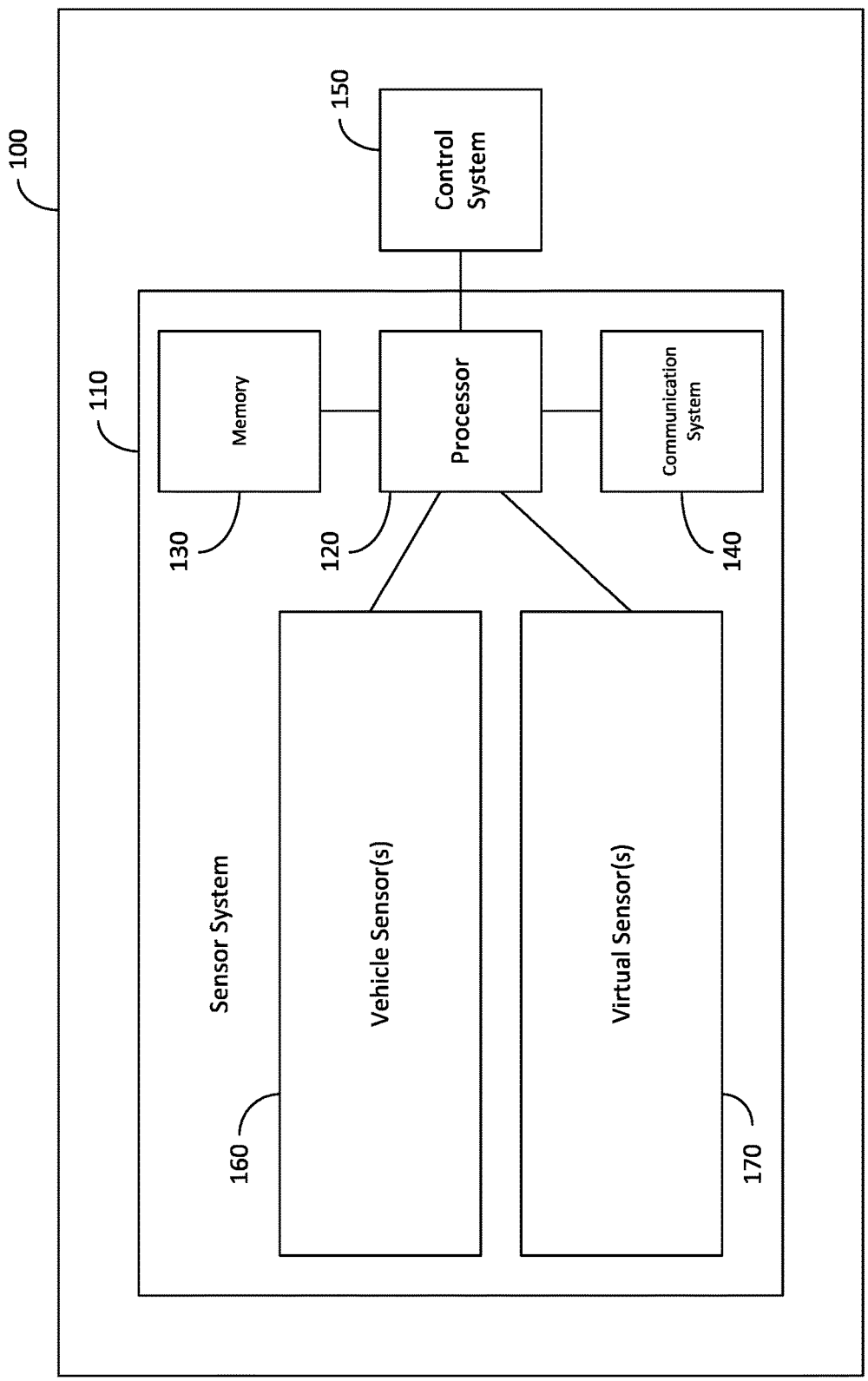
FIG. 1 is a block diagram of a vehicle, in accordance with an embodiment.

FIG. 1 is a block diagram of a vehicle 100, in accordance with an embodiment. The vehicle 100 may be of any type including, but not limited to, an automobile, a motorcycle, an aircraft (e.g., airplane, a helicopter, a drone, etc.), a watercraft, or the like. The vehicle 100 includes a sensor system 110 which utilizes data from sensors on the vehicle 100 as well as data from sensors from one or more other vehicles, as discussed in further detail below.

The sensor system 110 includes at least one processor 120. The processor(s) 120 may be a central processing unit (CPU), a graphics processing unit (GPU), a physics processing unit (PPU), an application specific integrated circuit (ASIC), a field programmable gate array (FPGA), a microcontroller, or any other logic device or any combination thereof. The processor(s) 120 (hereinafter referred to as a singular processor 120 merely for simplicity), may be dedicated to the sensor system 110 or may be shared by one or more other systems in the vehicle 100.

The sensor system 110 also includes memory 130. The memory 130 may be any combination of volatile and non-volatile memory. The memory 130 may dedicated to the sensor system 110, or shared with one or more other systems in the vehicle 100. Furthermore, the memory 130 may be located within the vehicle 100, may be a remote cloud based memory, or a combination thereof. The memory may store non-transitory computer readable instructions, which when executed by the processor 120, implement the sensor system 110, as discussed in further detail below.

The sensor system 110 further includes one or more communication systems 140. The communication system(s) 140 may be dedicated to the sensor system 110, or shared by one or more other systems in the vehicle 100. The communication system 140 may be, for example, a cellular communication system, a Wi-Fi communication system, a dedicated short range communication (DSRC) system, a Bluetooth communication system, a ZigBee communication system, a satellite communication system, or any other communication system or combination thereof.

The sensor system 110, and in particular the processor 120 of the sensor system 110, may generate commands for one or more control systems 150 in the vehicle 100. The control system(s) 150 may be, for example, a braking system, an acceleration system, a steering system, a driver warning system (e.g., a visual warning system, a warning sound generator or combination thereof), a shift control system, the like or any combination thereof.

The sensor system 110 includes one or more vehicle sensors 160. The vehicle sensor(s) 160 may include one or more radar sensors, one or more optical cameras, one or more infrared cameras, one or more Light Detection and Ranging (LIDAR) sensors, global positioning system (GPS) receivers, a temperature sensor, rain sensors, road condition sensors, ultrasonic sensors, or any combination thereof. The vehicle sensor(s) 160 output data to the processor 120 and is used to monitor for safety, used for navigation purposes, used to monitor road conditions, used to generate commands for one or more control systems 150, or any combination thereof.

The sensor system 110 further includes at least one virtual sensor 170. Each virtual sensor 170, like the vehicle sensor(s) 160, provides data to the processor 120 on the vehicle 100. However, the data source for a virtual sensor 170 comes from sensors on other vehicles or other dynamic or static sources (e.g., sensors on traffic lights or the like). Each virtual sensor 170 may be a specific type of sensor, such as a radar sensor, an optical camera, an infrared camera, a LIDAR sensor, a GPS sensor, a temperature sensor, a rain sensor, a road condition sensor, or any other type of vehicle sensor. However, a virtual sensor 170 could also be an application virtual sensor. An application virtual sensor may combine data from multiple types of vehicle sensors from one or more other vehicles and output data for a specific application. For example, a virtual sensor 170 may be an automatic cruise control sensor, the output of which is a following speed for an automatic cruise control mode. An automatic cruise control sensor would use data from, for example, a GPS system, an optical camera, a LIDAR sensor and the like, from one or more other vehicles other than the vehicle 100 to determine a proper following speed for the vehicle 100 and to output the following speed to the processor 120. A lane change assist sensor, for example, could collect static and dynamic information about adjacent lanes including, for example, a lane's availability, condition, curvature occupancy data, or the like.

One or more of the virtual sensors 170 may be generated on demand, depending upon the needs of the vehicle 100. Using the example of an automated cruise control system discussed above, the virtual sensor for providing following speed may only be generated when a user enables cruise control within the vehicle. Other virtual sensors may be generated whenever the vehicle is in operation, such as a virtual sensor for object tracking or temperature sensing.

The virtual sensor 170 may be constructed by the processor 120. However, in another embodiment, the virtual sensor 170 may be constructed by a server, as discussed in further detail below. In this embodiment, the virtual sensor 170 would process data from other vehicle remotely and send the output of the virtual sensor 170 to the vehicle 100.

Figure 2:
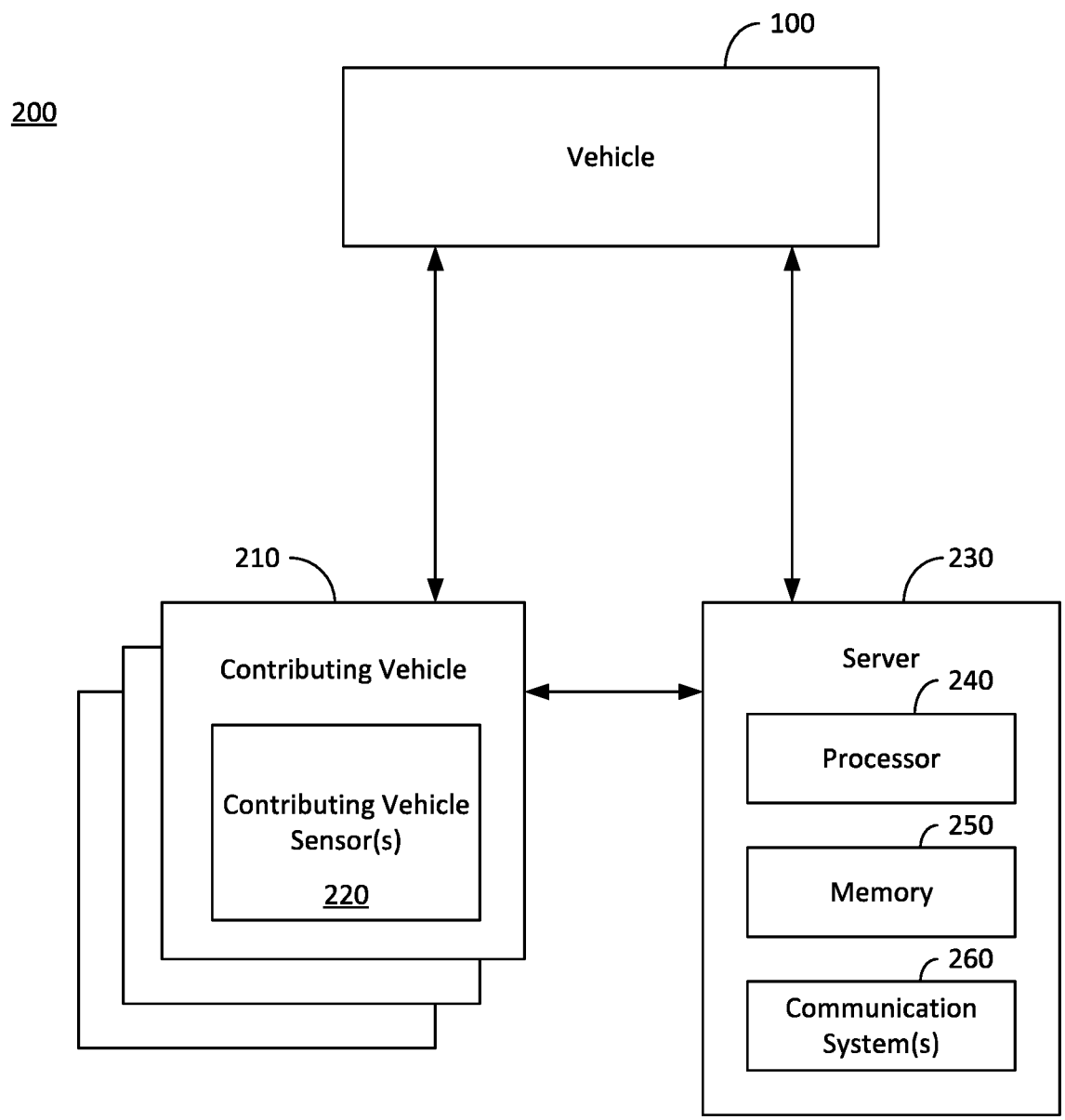
FIG. 2 is a block diagram illustrating a crowdsource-based sensor system in accordance with an embodiment.

FIG. 2 is a block diagram illustrating a crowdsource-based sensor system 200 in accordance with an embodiment. The crowdsource-based sensor system 200 includes a vehicle 100 as discussed above, as well as one or more contributing vehicles 210. The contributing vehicles 210 may utilize a virtual sensor 170 in a similar manner as the vehicle 100 as well as data from other physical sensors on the contributing vehicles 210, hereinafter referred to as contributing vehicle sensor(s) 220. However, the contributing vehicles 210 could alternatively contribute data to the crowdsource-based sensor system 200 from the contributing vehicle sensor(s) 220, without utilizing a virtual sensor 170.

In one embodiment, for example, the contributing vehicles 210 may directly transmit data from the contributing vehicle sensor(s) 220 to the vehicle 100 and the processor 120 of the vehicle 100 may construct the virtual sensor 170. However, in another embodiment, for example, the contributing vehicles 210 may transmit data from the contributing vehicle sensor(s) 220 to a server 230. In this embodiment, the server 230 may generate the virtual sensor 170 and transmit the output of the virtual sensor 170 to the vehicle 100. In yet other embodiments, a combination of the systems may be implemented. In other words, the processor 120 of the vehicle 100 may construct one or more virtual sensors and the server 230 may also construct one or more virtual sensors 170 for the vehicle 100.

The server 230 includes a processor 240, a memory 250 and one or more communication systems 260. The processor 240 may be a central processing unit (CPU), a graphics processing unit (GPU), a physics processing unit (PPU), an application specific integrated circuit (ASIC), a field programmable gate array (FPGA), a microcontroller, or any other logic device or any combination thereof. The memory 250 may be any combination of volatile and non-volatile memory. The memory 250 may be the cloud based memory utilized by the vehicle 100, as discussed above. The memory may store non-transitory computer readable instructions, which when executed by the processor 240, implement the crowdsource-based sensor system 200, as discussed in further detail below. The communication system(s) 260 may be any combination of wired or wireless communication systems.

In one embodiment, for example, the server 230 may provide a subscription based virtual sensor 170 to the vehicle. In other words, a user of the vehicle 100 may subscribe to a service to provide additional sensor capabilities to the vehicle 100 using crowdsourced data from other contributing vehicles 210. The server 230 could provide a full suite of virtual sensors to the vehicle 100, depending upon the available data resources (i.e., depending upon the number of contributing vehicles 210 which are gathering relevant data), or a user could subscribe for one or more specific virtual sensors 170.

Figure 3:
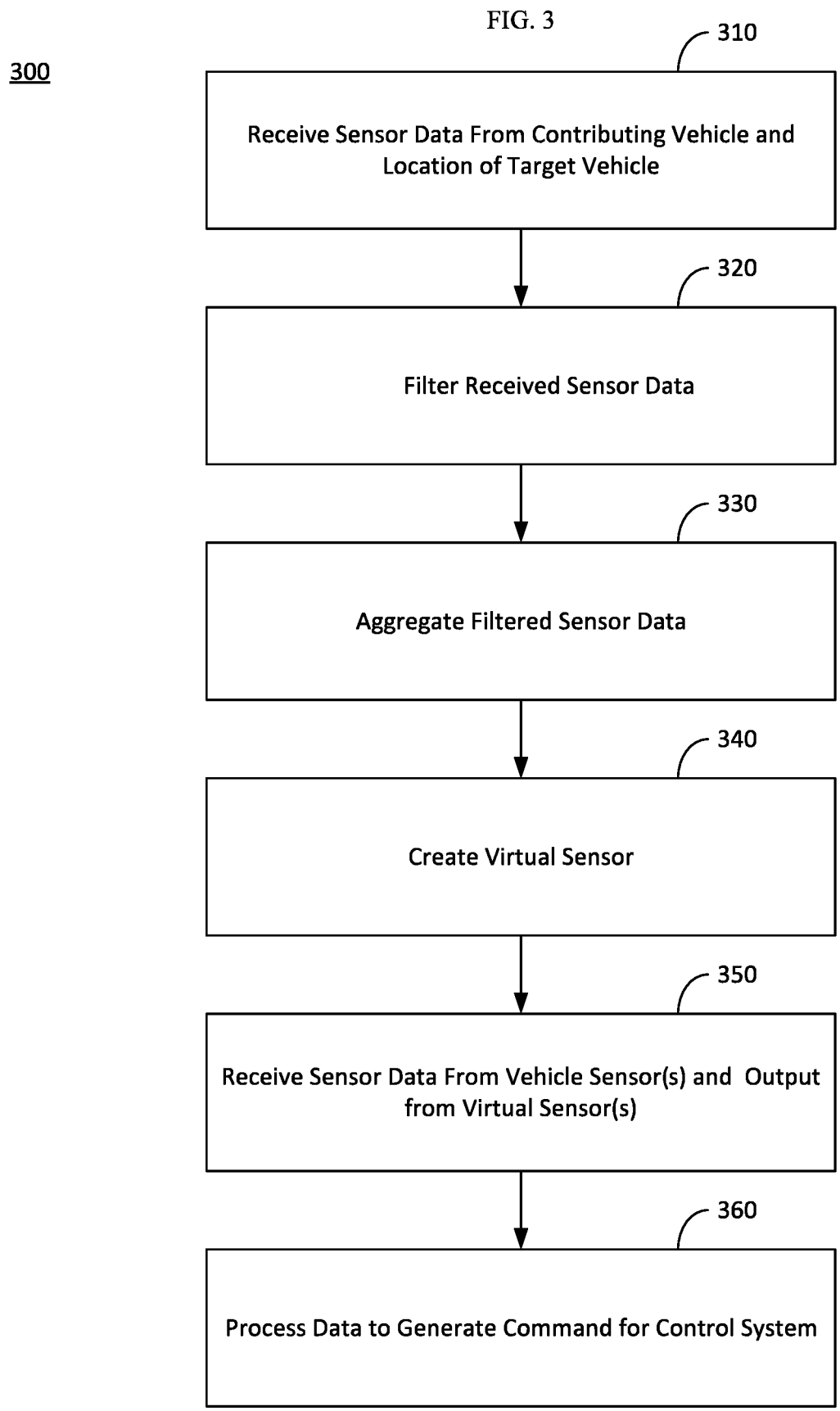
FIG. 3 is a flow diagram illustrating an exemplary method for operating the crowdsource-based sensor system, in accordance with an embodiment.

FIG. 3 is a flow diagram illustrating an exemplary method 300 for operating the crowdsource-based sensor system 200, in accordance with an embodiment. A processor first receives crowdsourced sensor data from one or more contributing vehicles and a location of the target vehicle (i.e., vehicle 100). (Step 310). The processor may be the processor 120 in the vehicle 100 or the processor 240 of the server 230. As discussed above, the vehicle 100 may construct the virtual sensor 170 based upon data received from other nearby contributing vehicles 210 or the virtual sensor 170 may be constructed by the server 230. In the embodiment where a server 230 is constructing the virtual sensor 170, the vehicle 100 transmits the location of the vehicle 100 to the server 230 via the communication system 140. The processor 120 of the vehicle may also transmit data from its sensors 160 for use by the server 230 for the purpose of constructing a virtual sensor for another vehicle. The processor 120 of the vehicle 100 may determine the location of the vehicle 100 using, for example, a GPS system (not illustrated), or the like.

The received sensor data may include sensor metadata such as a type of sensor, such as an optical camera, infrared camera, radar sensor, LIDAR sensor, or the like, and the capabilities of the sensor, such as a resolution of the sensor, the range of the sensor or the like. The contributing vehicles 210 may send the sensor data to the vehicle 100 and/or the server 230 according to a predefined format to simplify the processing of the sensor data. The format may include the sensor metadata as well as timestamp and location information of the respective contributing vehicle 210.

The processor (i.e., processor 120 in the vehicle 100 or the processor 240 of the server 230) then filters the received sensor data. (Step 320). The sensor data is filtered based upon one or more of the relevancy of the sensor data, the sensor capabilities of the vehicle 100, the weather conditions around the vehicle 100, the quality and reliability of the sensor source based upon past history, authenticity and certifiability, and the status of the vehicle 100. The filtering can include one of eliminating sensor data based upon one or more criteria and prioritizing sensor data, or a combination thereof. Sensor data having different priority levels may be assigned different weights when the data is considered, as discussed in further detail below.

The relevancy of the sensor data may be based, for example, on the location of the contributing vehicle 210 which transmitted the sensor data relative to the location of the vehicle 100, the location of the contributing vehicle 210 which transmitted the sensor data relative any projected path of the vehicle 100, and a timestamp associated with the sensor data. Sensor data which is not relevant to the vehicle 100 is filtered out by the processor. Irrelevant sensor data may include, for example, a contributing vehicle 210 that may be within communication range of the vehicle 100 for the vehicle 100 to receive the sensor data, which would depend upon the type of communication system 140 used during the exchange, or within a predetermined distance of the vehicle 100, but may be traveling away from the vehicle 100 (e.g., already behind the vehicle 100, or in a different direction after an intersection) or may be traveling along a different street entirely which is not along a possible projected path of the vehicle 100. The possible projected path of the vehicle 100 may be based upon, for example, an address entered into a navigation system associated with the vehicle 100, a turn signal of a vehicle, a lane of travel of the vehicle, travel history (e.g., work commutes or the like), or the like.

Likewise, the timestamp associated with the sensor data may be used to filter the sensor data. The timestamp may be used, for example, in object position predictions. For example, if an object (such as another vehicle) is detected by a contributing vehicle 210 to be heading towards the vehicle 100 at a certain speed, the timestamp can be used to predict a possible future position of the object based upon its last known position, last known speed and the timestamp. If the predicted future position of the object is irrelevant, the data corresponding to the object may be filtered out by the processor 120. The timestamps may also be used to filter out data too old to be relevant for certain applications. For example, object location data with a, for example, ten to fifteen second old timestamp may be filtered out, or given a significantly lower priority rating, as too old to be useful for the purpose of object location prediction. However, the exact same data could still be useful for a virtual sensor acting as a traffic sensor for the purpose of rerouting the vehicle 100 and could pass through a filter or be given a high rating.

As discussed above, the processor could also filter the sensor data based upon the capabilities of the vehicle sensor(s) 160 of the vehicle 100. In one embodiment, for example, the processor could filter out sensor data from contributing vehicles 210 based upon a sensor type which the vehicle 100 already includes. In other words, the virtual sensor 170 could be used add the capabilities of one or more sensors that the vehicle 100 does not include. For example, if the vehicle 100 includes an optical camera sensor, but not an infrared camera sensor, the processor may filter out all received optical camera sensor data, which is otherwise relevant to the vehicle 100, and generate the virtual sensor 170 using only the infrared camera data. However, in other embodiments, sensor data from sensors of the same type as a vehicle sensor may not be filtered out. In these embodiments, the virtual sensor 170 may supplement the vehicle sensor 160 by providing additional data on areas that the vehicle sensor 160 may not have direct line of sight, thereby improving the capabilities of the vehicle sensor 160.

Weather events and time of day may also dictate how sensor data is filtered. Different sensor types may perform well in certain environments (e.g., an optical sensor in clear weather and broad daylight), and poorly in others (e.g., an optical sensor in fog at night). Accordingly, sensor data from different types of sensors may be removed and/or weighted according to the weather and time of day at the location of the vehicle 100. The weather data may be based upon centralized weather data (e.g., from a weather service), or based upon data from sensors of the vehicle 100, such as rain sensors, road condition sensors, or the like.

The processor then aggregates the filtered sensor data. (Step 330). The sensor data may be aggregated into data-specific data or aggregated into application specific data, or a combination thereof. In other words, the filtered sensor data is grouped into one or more data specific groups, one or more application specific groups, or a combination thereof. The aggregated data may be stored in the memory 130 of the vehicle or the memory 250 of the server 230 for subsequent processing, as discussed in further detail below.

Figure 4:
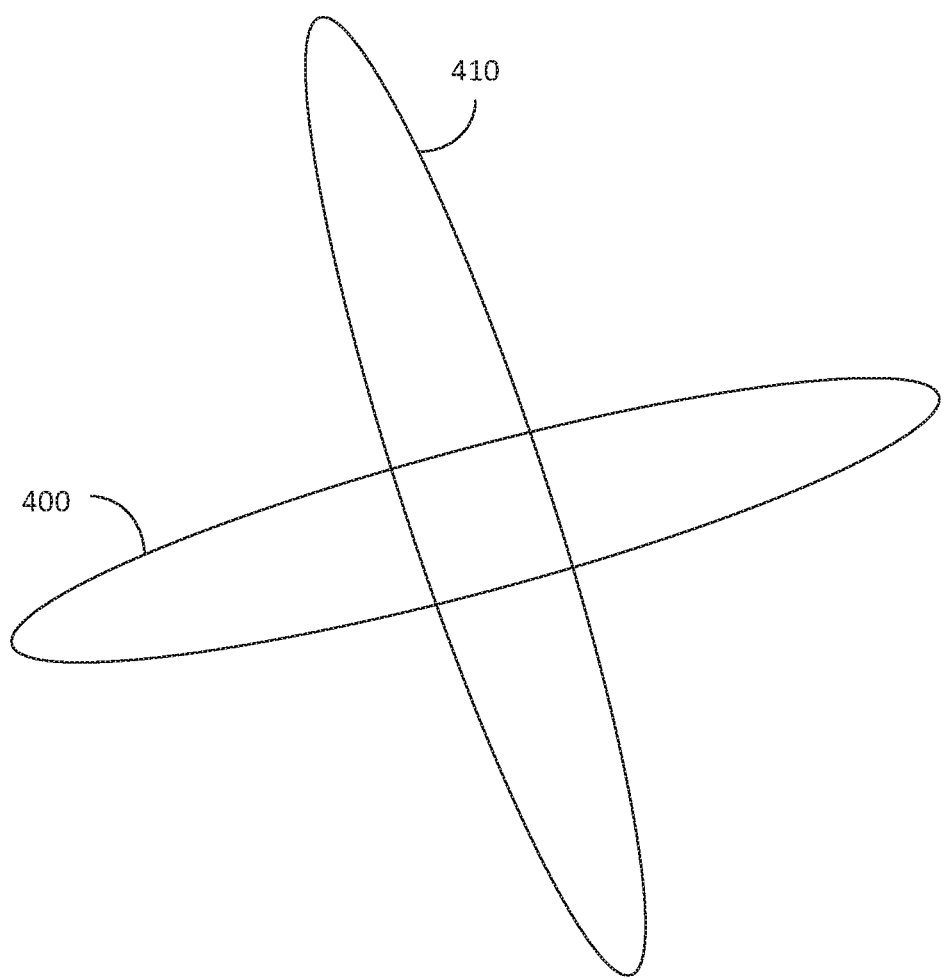
FIGS. 4 and 5 illustrate object aggregation, in accordance with an embodiment.
Figure 5:
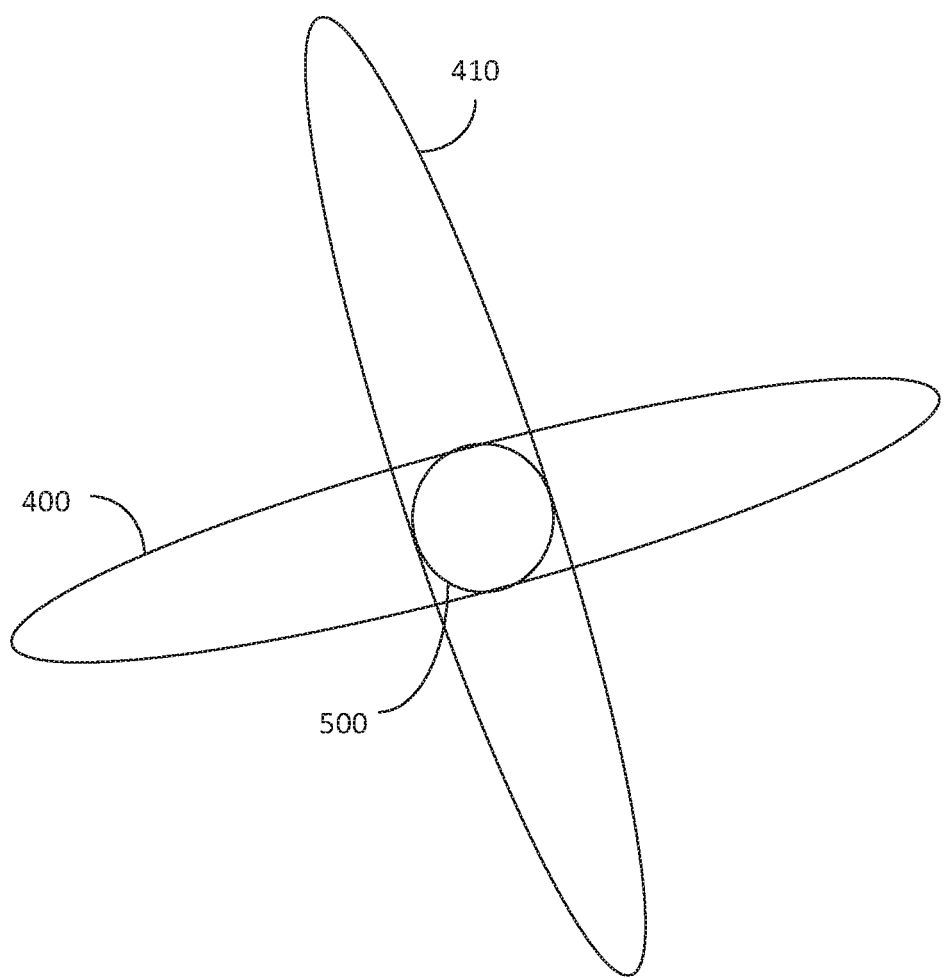

A data specific aggregation may collect sensor data from a specific type of sensor. For example, temperature data from temperature sensors from multiple vehicles may be collected. Likewise sensor data from, for example, multiple radar sensors in contributing vehicles 210 may be aggregated into a single radar sensor data source. In this example, the radar sensors would likely be tracking objects from the perspective of the contributing vehicle 210 which senses the object. The objects may be, for example, other vehicles (contributing or non-contributing), pedestrians, bicycles, traffic/construction signs or equipment, animals, or the like. In the case of object tracking, an object detected by multiple sensors from different contributing vehicles 210 may be aggregated into a single object. FIGS. 4 and 5 illustrate object aggregation, in accordance with an embodiment. Object 400 represents an object tracked by a first contributing sensor 220 on a first contributing vehicle 210. Object 410 represents an object tracked by a second contributing sensor 220 on a second contributing vehicle 210. The processor may associate objects 410 and 420 together based upon the location of the objects in the sensor data. For example, if the sensor data from the respective contributing sensors 220 include data on an object which overlaps, the processor may merge the object data into a single object 500, as seen in FIG. 5. As the objects 400 and 410 are sensed from the perspective of the respective contributing vehicle 210, the actual dimensions of the object is unknown as the contributing sensor can only detect an object from a single perspective. Accordingly, a single vehicle generally assumes that the object has a Gaussian distribution with mean and covariance matrix, hence the representative shape of objects 400 and 410 seen in FIG. 4. The objects 400 and 410 may be merged into the single object 500 using, for example, lest-squares estimate, Kalman filtering, or other Bayesian-like filtering techniques, or the like. Accordingly, by aggregating the data from multiple contributing sensors 220 on multiple contributing vehicles 210, the aggregated data more accurately reflects the actual object.

As an illustrative example, we assume the state vector for object (e.g., position and velocity of the vehicle) is x, and it is modeled by a Gaussian distribution. The Gaussian distribution is denoted by $N(\mu, \Sigma)$ where $\mu$ is the mean and $\Sigma$ is the covariance matrix. A Gaussian distribution can be represented by an ellipse with μ being the center and Σ determining the elliptic shape. For computational simplicity, μ and Σ usually are transferred to the row concatenated matrix [R, z] where R is upper triangular matrix and $\Sigma = R^{-1}R^{-T}$, and z=Rμ. The distribution for the object 400 can be denoted by [$R_1$, $z_1$], and the object 410 by [$R_2$, $z_2$]. The fused object 500 can be calculated by applying least-squares procedure to minimize the following quadratics:

$$\|R_1 x - z_1\|^2 + \|R_2 x - z_2\|^2$$

Vertically concatenating rows into a matrix $$A = \begin{pmatrix} R_1 & z_1 \\ R_2 & z_2 \end{pmatrix},$$

and apply the QR decomposition to it:

$$A = Q \begin{pmatrix} R_F & z_F \\ 0 & e \end{pmatrix}$$

where Q is an orthogonal matrix ($Q^T Q = I$)
Derived from the triangular matrix $$\begin{pmatrix} R_F & z_F \\ 0 & e \end{pmatrix},$$

the distribution of the fused object 500 can be written as [R, z]. The mean is $\mu_F = R_F^{-1} z_F$, and covariance matrix as $\Sigma_F = R_F^{-1} R_F^{-T}$.

An application specific aggregation may collect data for a specific application. The application specific aggregation may utilize the data from different types of contributing sensors 220 for a specific application. The application may be, for example, adaptive cruise control, forward collision warning and avoidance, lane centering control, lane change control, or the like. In an adaptive cruise control application, for example, object tracking data from one or more radar sensors, LIDAR sensors and vision cameras (infrared or optical) may be aggregated in a similar manner as discussed above to track one or more objects ahead of the vehicle. The aggregated object data may be combined with GPS coordinates and, for example, speed limit data, to enable the creation of an adaptive cruise control virtual sensor, as discussed in further detail below.

Once the sensor data is filtered and aggregated, the processor creates one or more virtual sensors 170. (Step 340). The created virtual sensor(s) 170 processes the filtered and aggregated data based upon their specific purpose. Using the examples discussed above, a virtual temperature sensor may be created by the processor by processing the temperature data from the contributing sensors 220. The virtual temperature sensor may, for example, average the received temperatures, or determine a median temperature of the received temperatures, and output the determine temperature. A virtual radar sensor, for example, would output location data corresponding to the merged objects detected by the radar sensors in multiple contributing vehicles 210 relative to the location of the vehicle 100. A virtual adaptive cruise control sensor, for example, may output a reference speed to maintain a safe distance from another vehicle in front of the vehicle 100 by processing the filtered and aggregated object data, speed limit data and GPS coordinates. When there is insufficient data to generate the virtual sensor 170, for example, when there are not enough contributing vehicles in the area of the vehicle 100, the processor (either on the vehicle 100 or in the server 230) may reduce the weight of the data output from the virtual sensor 170 based upon the amount of data available to the virtual sensor 170.

In one embodiment, for example, the virtual sensor 170 may output the respective output data at a predetermined rate. Sensor data from contributing vehicles 210 may be received by the vehicle 100 or the server 230 in an asynchronous manner. In other words, the incoming data can be received at an unpredictable rate. Accordingly, the processor may filter and aggregate data for a predetermined amount of time for a given output cycle, and process the filter and aggregate data once every cycle period to output the virtual sensor data at the predetermined rate. This allows the virtual sensor 170 to output data at a predictable rate, even when the rate of the incoming data from the contributing sensors 220 on the contributing vehicles 210 is unpredictable.

The processor 120 receives sensor data from the vehicle sensor(s) 160 and the output of the virtual sensor(s) (Step 350). When the server 230 is generating the virtual sensor 170, the server 230 transmits the output of the virtual sensor 170 to the vehicle using the respective communication systems 140 and 260.

The processor 120 of the vehicle 100 then processes the received data to generate a command for a control system 150. (Step 360). The processing and commands generated can vary depending upon the virtual sensor(s) 170 which were generated, the output of the virtual sensor(s) 170 as well as the type of vehicle sensors 160 on the vehicle 100. For example, a virtual adaptive cruise control sensor would output a reference speed. Accordingly, the command may be an acceleration or braking command to reach or maintain the reference speed.

When the vehicle 100 includes one or more vehicle sensors 160 which serve a similar purpose as the virtual sensor 170, the data from the vehicle sensor(s) 160 can be aggregated in the same manner as discussed above to further improve the quality of data available to the vehicle 100. The sensor data from the vehicle sensor(s) 160 is associated with its covariance matrix (e.g., Σ). The covariance matrix is derived from a sensor performance specification. The weight (i.e., R) is the Cholesky factor of the inversion of the covariance matrix when aggregating the data from difference sources. Accordingly, the processor 120 can weigh the sensor data from the virtual sensor(s) 170 and the vehicle sensor(s) 160 based upon the quality of the available data when aggregating the data to improve the reliability of the aggregated data.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

What is claimed is:

1. A crowdsourced virtual sensor generator, comprising: a server, the server comprising:
   a communication system configured to receive contributing vehicle sensor data from one or more sensors on one or more contributing vehicles, a location of the one or more contributing vehicles and a location of a target vehicle; and
   a processor communicatively coupled to the communication system, the processor configured to:
      filter the received contributing vehicle sensor data based upon the location of the one or more contributing vehicles and the location of the target vehicle;
      aggregate the filtered contributing vehicle sensor data into at least one of a data-specific dataset and an application-specific data set;
      generate a virtual sensor for the target vehicle, the virtual sensor processing the filtered and aggregated contributing vehicle sensor data to generate output data relative to the location of the target vehicle; and
      transmit the output data from the virtual sensor to the target vehicle via the communications system.

2. The crowdsourced virtual sensor generator of claim 1, wherein the processor is configured to filter contributing vehicle sensor data based upon a type of sensor associated with the received contributing vehicle sensor data.

3. The crowdsourced virtual sensor generator of claim 1, wherein the processor is configured to filter contributing vehicle sensor data based upon a relevancy of the contributing vehicle sensor data to the target vehicle, the relevancy based upon the location of the one or more contributing vehicles, a direction of travel of the one or more contributing vehicles, the location of the target vehicle and a timestamp associated with the contributing vehicle sensor data.

4. The crowdsourced virtual sensor generator of claim 1, wherein the target vehicle includes at least one vehicle sensor and the virtual sensor generated by the processor is a type of sensor different from each of the at least one vehicle sensor.

5. The crowdsourced virtual sensor generator of claim 4, wherein the feature is automatic cruise control.

6. The crowdsourced virtual sensor generator of claim 1, wherein the output from the virtual sensor adds a feature to the target vehicle that the target vehicle could not otherwise provide.

7. The crowdsourced virtual sensor generator of claim 1, wherein the processor is further configured to generate the virtual sensor based upon a subscription of the target vehicle, the subscription defining one or more data-specific features or application specific features the target vehicle has subscribed for.

8. The crowdsourced virtual sensor generator of claim 1, wherein the data-specific data set is object location data.

9. The crowdsourced virtual sensor generator of claim 1, wherein the application-specific data set corresponds to a specific vehicle feature provided by the virtual sensor.

* * * * *